United States Patent

Ogino et al.

[11] Patent Number: 5,480,977
[45] Date of Patent: Jan. 2, 1996

[54] DISAZO DYES HAVING AMINOBENZOYLAMINO GROUP

[75] Inventors: Kazuya Ogino, Minoo; Narutoshi Hayashi, Toyonaka; Takashi Omura, Kobe, all of Japan

[73] Assignee: Sumitomo Chemical Company, Limited, Osaka, Japan

[21] Appl. No.: 134,942

[22] Filed: Oct. 13, 1993

[30] Foreign Application Priority Data

Oct. 13, 1992 [JP] Japan .................... 4-274120

[51] Int. Cl.$^6$ .................. C09B 45/24; F21V 9/14
[52] U.S. Cl. .................. 534/717; 252/585; 8/506
[58] Field of Search .................. 534/717

[56] References Cited

U.S. PATENT DOCUMENTS

| | | | |
|---|---|---|---|
| 4,514,559 | 4/1985 | Sato | 534/690 |
| 4,988,805 | 1/1991 | Kunde | 534/717 |
| 5,233,027 | 8/1993 | Hinrichs et al. | 534/717 X |
| 5,354,512 | 10/1994 | Ogino et al. | 252/585 |

FOREIGN PATENT DOCUMENTS

| | | |
|---|---|---|
| 0342241 | 11/1989 | European Pat. Off. . |
| 0459259 | 12/1991 | European Pat. Off. . |
| 0530106 | 3/1993 | European Pat. Off. . |
| 3236238 | 5/1984 | Germany . |
| 57-145155 | 9/1982 | Japan . |
| 1-183602 | 7/1989 | Japan . |
| 1-252904 | 10/1989 | Japan . |
| 3-89203 | 4/1991 | Japan . |

*Primary Examiner*—Johann Richter
*Assistant Examiner*—Fiona T. Powers
*Attorney, Agent, or Firm*—Cushman Darby & Cushman

[57] ABSTRACT

The invention is directed to a novel disazo compound represented by the formula (I)

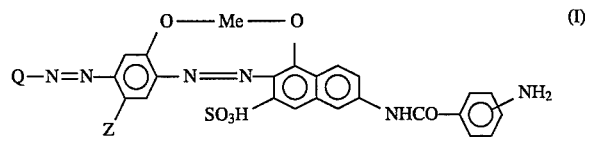

wherein Q is a substituted or unsubstituted phenyl or naphthyl group; Me is copper, nickel, zinc or iron; and Z is hydrogen, lower alkyl, lower alkoxyl, sulfo, or substituted or unsubstituted amino; and also to a polarizing film having said disazo compound incorporated into a polarizing film base. The polarizing film exhibits high polarizing activities comparable to those of an iodine-containing polarizing film, and also has excellent durability.

5 Claims, No Drawings

DISAZO DYES HAVING AMINOBENZOYLAMINO GROUP

This invention relates to a disazo compound and a polarizing film containing the same.

Currently, polarizing films are generally prepared by incorporating iodine or a dichromatic dye as a polarizing element into a film of polyvinyl alcohol or its derivative, which has been oriented by stretching, or a polyene film, which has been prepared by dehydrochlorinating a polyvinyl chloride film or dehydrating a polyvinyl alcohol film to produce polyene, and oriented by stretching.

Among those, iodine-containing films are excellent in early stage polarizing activities, but poor in the durability to water and heat. Thus, the films have some drawbacks in the lowered polarizing activities after having been used for a certain period of time at high temperatures under highly humid conditions. Several methods for improving the durability have been proposed, in which the film is intensely treated with formalin or an aqueous boric acid solution, or a polymer film having a low moisture permeability is employed as a protecting film, but these methods are not yet fully satisfactory.

Dichromatic dye-containing polarizing films are more excellent in the durability to water and heat, but poorer in the polarizing activities than iodine-containing polarizing films. For example, EP-A-342 241 has disclosed a polarizing film containing a disazo dye having the following formula:

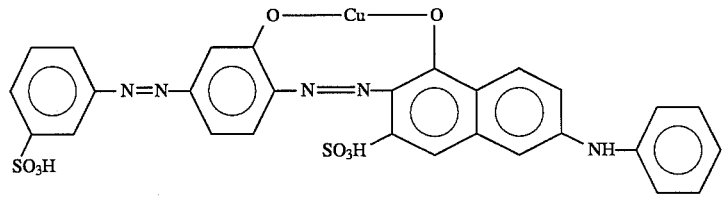

but it does not yet sufficiently meet the needs of customers.

An object of the present invention is to provide a disazo compound which can be suitably used for dye-containing polarizing films excellent in both the polarizing activities and the durability to water and heat. Another object of the present invention is to provide a polarizing film containing the same. Other objects will be made clear from the following description.

The present invention provides a disazo compound represented by the following formula (I) as shown in the form of free acid:

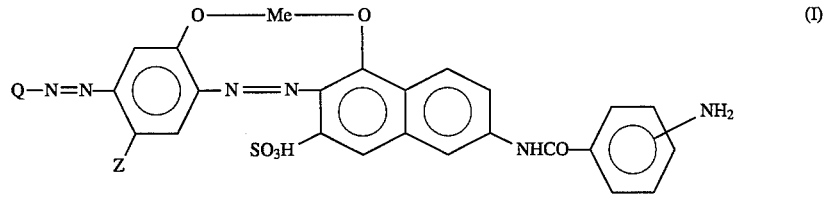

wherein Q is a substituted or unsubstituted phenyl or naphthyl group; Me is a copper, nickel, zinc or iron atom; and Z is a hydrogen atom or a lower alkyl, lower alkoxyl, sulfo, or substituted or unsubstituted amino group; and also provides a polarizing film having the disazo compound incorporated in a polarizing film base.

The disazo compounds represented by the above formula (I) are characterized in that they not only have a wide absorption region within the visible radiation wavelength region, i.e. 400 to 700 nm, but also have high polarizing activities and cause no discoloration and decrease in the polarizing activities even at high temperatures under high humidity conditions.

The phenyl group denoted by Q in the above formula (I) is preferably represented by the following formula:

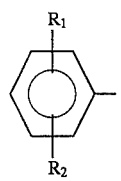

wherein $R_1$, and $R_2$ independently of one another are each a hydrogen atom, a nitro, sulfo, sulfamoyl, $C_1$–$C_4$ alkyl, $C_1$–$C_4$ alkoxyl, substituted or unsubstituted amino or carboxyl group, or a halogen atom. Particularly preferable is a phenyl group substituted with a nitro, sulfo, sulfamoyl, methyl, ethyl, methoxyl, ethoxyl or carboxyl group, or a chlorine atom.

The naphthyl group denoted by Q is preferably represented by the following formula:

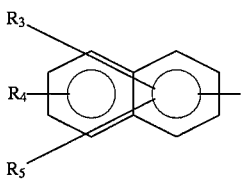

wherein $R_3$, $R_4$ and $R_5$ independently of one another are each a hydrogen atom or a hydroxyl or sulfo group. Particularly preferable is a naphthyl group substituted with 1, 2 or 3 sulfo groups.

Preferable Z in the above formula (I) includes, for example, a hydrogen atom, a methyl, ethyl, methoxyl, ethoxyl, acetylamino, methylsulfonylamino, ureido, methylamino, amino or sulfo group, and the like.

The disazo compounds represented by the formula (I) may be prepared, for example, according to the process mentioned below.

A compound represented by the following formula (II):

wherein Q has the same meaning as mentioned above, is diazotized according to a conventional method, and the product is then subjected to a coupling reaction with a compound represented by the following formula (III):

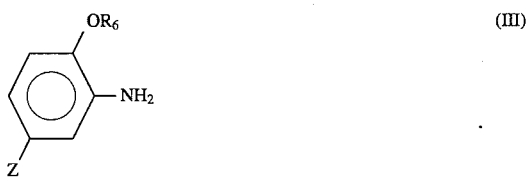

wherein $R_6$ is a hydrogen atom or a lower alkyl group and Z has the same meaning as mentioned above, or its ω-methanesulfonated compound. The coupling product is, if required, subjected to hydrolysis, and then diazotized according to a conventional method, and the resulting diazotized compound is subjected to a coupling reaction with a compound represented by the following formula (IV):

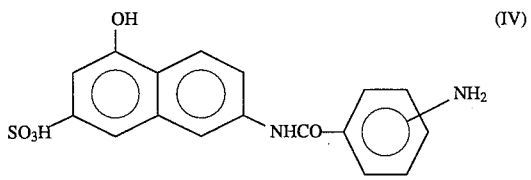

to give a disazo compound, which is then derived to a metal complex with copper, nickel, zinc or iron according to a conventional method to give the disazo compound of the formula (I).

The compounds represented by the formula (II) include, for example, 1-aminobenzene, 1-amino-2-, 3- or 4-nitrobenzene, 1-amino-2-, 3- or 4-benzenesulfonic acid, 5-aminobenzene-3-disulfonic acid, 6-aminobenzene1,4-disulfonic acid, 4-aminobenzene-1,2-disulfonic acid, 1-amino-2-, 3- or 4-sulfamoylbenzene, 1-amino-2-, 3- or 4-benzoic acid, 1-amino-2-, 3- or 4-chlorobenzene, 1-amino-2,5-dichlorobenzene, 1-amino-2, 3- or 4-bromobenzene, 1-amino-2-, 3- or 4-methylbenzene, 1-amino-2-, 3- or 4-ethylbenzene, 1-amino-2-, 3- or 4-methoxybenzene, 1-amino-2-, 3- or 4-ethoxybenzene, 1,4-diaminobenzene-2sulfonic acid, 4-di(βhydroxyethyl)amino-1-aminobenzene, 1-aminonaphthalene-4-, 5-, 6-, 7- or 8-sulfonic acid, 2-aminonaphthalene-1-, 8-, 7-, 6- or 5-sulfonic acid, 1-aminonaphthalene-4,7-, 4,6-, 3,7-, 3,8- or 3,6disulfonic acid, 2-aminonaphthalene-4,8-, 6,8-, 3,6-, 1,5- or 5,7-disulfonic acid, 1-aminonaphthalene-3,6,8-trisulfonic acid, 2-aminonaphthalene-3,6,8- or 4,6,8trisulfonic acid, and the like.

The compounds represented by the formula (III) include, for example, 1-amino-2-hydroxybenzene, 1-amino-2-methoxybenzene, 1-amino-2-methoxy-5-methylbenzene, 1-amino-2,5-dimethoxybenzene, 1-amino-2-methoxy-5-ethoxybenzene, 1-amino-2-methoxy-5-benzenesulfonic acid, 1-amino- 2-methoxy-5-acetylaminobenzene, 1-amino-2-methoxy-5-carbamoylaminobenzene, 1,3-diamino-6-methoxybenzene, 1-amino-2-methoxy-5-methylsulfonylaminobenzene, and the like.

The compounds represented by the formula (IV) include, for example, 7-(2'-, 3'- or 4' -aminobenzoyl)-amino-4-naphthol-2-sulfonic acid.

The thus obtained disazo compounds represented by the formula (I) may be used in the form of free acid, but preferably are used in the form of sodium salt. Alternatively, they may be used in the form of lithium salt, potassium salt, ammonium salt, ethanolamine salt, alkylamine salt or the like.

The disazo compounds represented by the formula (I) may be used each alone or as a mixture of two or more of them. It is also possible to use one or more of them in combination with one or more other organic dyes in order to compensate the hue and to improve the polarizing activity. Any organic dye may be used in this connection, so long as it has a varied absorption wavelength region from that of the present compound and a high dichroism. Such dyes in terms of Color Index (C.I.) include, for example, C.I. Direct Yellow 12,
C.I. Direct Yellow 28,
C.I. Direct Yellow 44,
C.I. Direct Yellow 142,
C.I. Direct Blue 1,
C.I. Direct Blue 15,
C.I. Direct Blue 71,
C.I. Direct Blue 78,
C.I. Direct Blue 98,
C.I. Direct Blue 168,
C.I. Direct Blue 202,
C.I. Direct Red 2,
C. I. Direct Red 31,
C.I. Direct Red 81,
C.I. Direct Red 240,
C.I. Direct Red 247,
C. I. Direct Orange 6,
C. I. Direct Orange 26,
C. I. Direct Orange 39,
C. I. Direct Orange 107,
C. I. Direct Violet 9,
C. I. Direct Violet 51, and
C.I. Direct Brown 106.

The polarizing films of the present invention may be prepared by incorporating the disazo compound represented by the formula (I), as a dichromatic dye, into a polymer film base according to a well-known method.

The polymer films may be those which are made from polyvinyl alcohol or its derivative unmodified or modified with an olefin such as ethylene and propylene, crotonic acid, acrylic acid, methacrylic acid, maleic acid or the like, or from an EVA (ethylene-vinyl acetate) resin, a saponified EVA resin, a nylon resin, a polyester resin, or the like. A film of polyvinyl alcohol or its derivative is preferred from the view points of dye fixation and orientation.

Incorporation of the dichromatic dye into a polymer film is usually carried out according to a conventional method for dyeing a polymer film. For instance, the disazo compound represented by the formula (I) with or without another dichromatic organic dye is dissolved in water to prepare a dye bath. The dye concentration in the dye bath is not critical, but usually in the range from 0.01 to 10 % by weight. If necessary, a dyeing auxiliary such as sodium sulfate may be used preferably in an amount of from 2 to 10 % by weight. Dyeing is carried out by dipping a polymer film into the dye bath thus prepared. Dyeing temperature is preferably in the range from 50° to 70° C.

Orientation of the dichromatic dye is conducted by stretching the film. Stretching may be conducted according to any of well-known methods such as a wet stretching method or a dry compression stretching method. The polymer film may be stretched prior to the dyeing.

If necessary, the polymer film is subjected to a post-treatment such as a boric acid treatment according to a well-known method in order to improve the light transmittance and polarizing activity of the polarizing film. Conditions for the treatment with boric acid vary depending on the kinds of polymer films and dichromatic dyes employed. The treatment is usually carried out in an aqueous boric acid solution having a concentration of 1 to 15 % by weight, preferably from 5 to 10 % by weight, at a temperature of 30 to 80° C., preferably from 50° to 75° C. The polymer film may further be subjected, if necessary, to a fixing treatment in an aqueous solution containing a cationic polymer compound.

The dye-containing polarizing film thus obtained may be laminated with a protective film having excellent optical transparency and mechanical strength, on one or both sides, to form a protected polarizing plate. The protective film may be that having been conventionally used, and includes, for example, a cellulose acetate or acrylic film, a fluorine type film such as a tetrafluoroethylene/hexafluoropropylene copolymer film, and a film of polyester resin, a polyolefin resin or a polyamide resin, each of which has been monoaxially stretched for orientation.

Thus, a polarizing film having a high polarizing activity and excellent in durability against water and heat can be obtained. In addition, a polarizing film of neutral color having excellent properties can be obtained by combining the disazo compound represented by the formula (I) with another organic dye.

The dye-containing polarizing films of the present invention exhibit excellent polarizing activities comparable to the activities obtained from iodine-containing films and also have excellent durability. The present polarizing films can be suitably applied to a variety of liquid crystal displays, particularly those to be loaded into automobiles and requiring excellent polarizing activities and durability, those to be loaded on industrial instruments which are used in various circumstances, and the like.

The present invention is now explained in more details with reference to the following examples, which are only illustrative, and never to limit the invention. In the examples, "part" means "part by weight", and "%" means "% by weight".

EXAMPLE 1

Into 200 parts of water was dispersed 17.3 parts of sulfanilic acid, and thereto were added 20.9 parts of 35 % hydrochloric acid and then 6.9 parts of sodium nitrite. The mixture was stirred for one hour at 5° C.

After adding 15.3 parts of 2,5-dimethoxyaniline, the mixture was stirred for additional one hour at 5°–10° C. Then, the pH was adjusted to 3 by adding sodium carbonate, thereby to secure the coupling reaction. Filtration of the reaction mixture gave a monoazo compound.

The resulting monoazo compound was dispersed in 200 parts of water, and 20.9 parts of 35 % hydrochloric acid and 6.9 parts of sodium nitrite were added thereto. Stirring of the mixture for 1 hour at 10°–15° C. gave a reaction mixture containing a diazotized monoazo compound.

Into 500 parts of water was dispersed 35.8 parts of 7-(4'-aminobenzoyl)amino-4-naphthol-2-sulfonic acid, and the reaction mixture containing the diazotized monoazo compound previously synthesized was poured into the dispersion. After adjusting the pH to 8 by adding sodium hydroxide, the reaction was allowed to proceed for 3 hours at 10°–15° C., thereby to give a reaction mixture containing a disazo compound.

The resulting reaction mixture of the disazo compound was mixed with 16.0 parts of anhydrous copper sulfate and 3 parts of monoethanolamine, and the reaction was allowed to proceed at 95° C. for 12 hours.

By addition of sodium chloride to the reaction mixture for salting out, a disazo compound of the following formula was obtained:

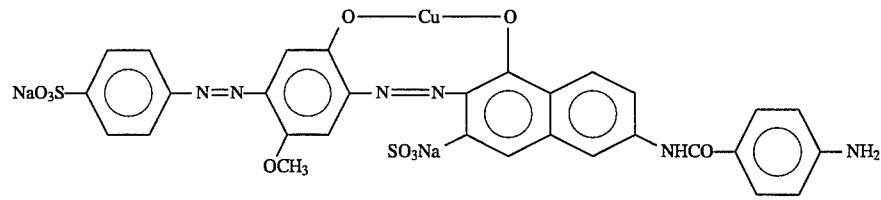

The compound gave a maximum absorption wavelength, λmax, of 616 nm in an aqueous medium.

EXAMPLE 2

Procedures in Example 1 were repeated except that 30.3 parts of 2-aminonaphthalene-6,8-disulfonic acid was used in place of the sulfanilic acid, to obtain a disazo compound represented by the following formula:

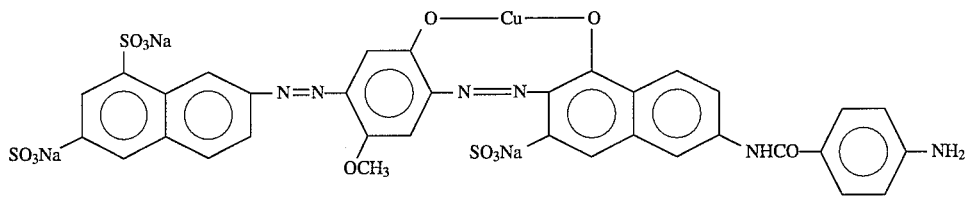

The compound gave λ max of 620 nm in an aqueous medium.

EXAMPLE 3

A polyvinyl alcohol film having a thickness of 75 μm (KURARAY VINYLON #7500; manufactured by KURARAY Co., Ltd.) was stretched monoaxially in the longitudinal direction to a four time length to form a polarizing film base. While being maintained under tension, the polyvinyl alcohol film was dipped into an aqueous solution containing 0.025 % of the disazo compound obtained in Example 1 and 2.0 % of sodium sulfate as a dyeing auxiliary at 60° C. for 20 minutes. The film was then dipped into an aqueous solution containing 7.5 % of boric acid at 65° C. for 5 minutes, washed with water at 20° C. for 20 seconds, and dried at 50° C. to give a polarizing film.

The film obtained had a maximum absorption wavelength, λmax, at 630 nm and exhibited a high polarizing activity and durability over a long period of time under conditions of high temperatures and high humidities.

EXAMPLE 4

Procedures in Example 3 were repeated except that the disazo compound obtained in Example 2 was used in place of the disazo compound in Example 3 to obtain a polarizing film.

The resulting film had λmax at 630 nm with a wide absorption region and exhibited a high polarizing activity.

EXAMPLE 5

Procedures in Example 3 were repeated except that each of the disazo compounds shown in the following tables is used in place of the disazo compound used in Example 3 to obtain respective polarizing films. In the tables, "hue" means the hue of each resulting polarizing film, and the structures are shown in the form of free acid.

Each of the resulting polarizing films exhibited a high polarizing activity and was excellent in the durability under conditions of high humidities and high temperatures.

| No. | Structure | Hue |
|---|---|---|
| 1 | [structure with naphthalene-SO₃H, N=N, benzene-CH₃, O-Cu-O, N=N, naphthalene-SO₃H, NHCO-phenyl-NH₂] | Blue |
| 2 | [structure with naphthalene-HO₃S/SO₃H, N=N, benzene-OCH₃, O-Cu-O, N=N, naphthalene-SO₃H, NHCO-phenyl-NH₂] | Greenish blue |
| 3 | [structure with naphthalene-SO₃H/SO₃H, N=N, benzene-CH₃, O-Cu-O, N=N, naphthalene-SO₃H, NHCO-phenyl-NH₂] | Blue |

-continued

| No. | Structure | Hue |
|---|---|---|
| 4 | (structure with Cu bridge, HO₃S-phenyl-N=N-tolyl-N=N-naphthalene-SO₃H, NHCO-phenyl-NH₂) | Blue |
| 5 | (structure with Cu bridge, OCH₃/SO₃H-phenyl-N=N-(OCH₃)phenyl-N=N-naphthalene-SO₃H, NHCO-phenyl-NH₂) | Greenish blue |
| 6 | (structure with Zn bridge, NO₂-phenyl-N=N-phenyl(SO₃H)-N=N-naphthalene-SO₃H, NHCO-phenyl-NH₂) | Purplish blue |
| 7 | (structure with Fe bridge, CH₃-phenyl-N=N-phenyl(NHCONH₂)-N=N-naphthalene-SO₃H, NHCO-phenyl-NH₂) | Blue |
| 8 | (structure with Cu bridge, naphthalene-(SO₃H)₂-N=N-(OCH₃)phenyl-N=N-naphthalene-SO₃H, NHCO-phenyl-NH₂) | Greenish blue |
| 9 | (structure with Cu bridge, SO₃H-naphthalene-N=N-tolyl-N=N-naphthalene-SO₃H, NHCO-phenyl-NH₂) | Blue |
| 10 | (structure with Cu bridge, HOOC-phenyl-N=N-phenyl(NHCOCH₃)-N=N-naphthalene-SO₃H, NHCO-phenyl-NH₂) | Blue |

-continued

| No. | Structure | Hue |
|---|---|---|
| 11 | | Greenish blue |
| 12 | | Greenish blue |
| 13 | | Purplish blue |
| 14 | | Blue |
| 15 | | Blue |
| 16 | | Blue |
| 17 | | Greenish blue |

-continued

| No. | Structure | Hue |
|---|---|---|
| 18 | | Blue |
| 19 | | Blue |
| 20 | | Greenish blue |
| 21 | | Greenish blue |

What we claim is:

1. A disazo compound represented by the formula (I) as shown in the form of free acid:

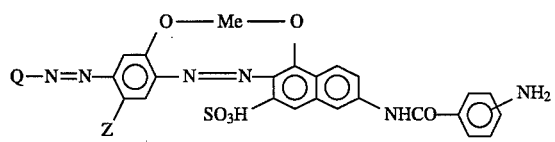

wherein Q is a substituted or unsubstituted phenyl or naphthyl group; Me is a copper, nickel, zinc or iron atom; and Z is a hydrogen atom, a methyl, ethyl, methoxyl, ethoxyl, or acetyl amino group.

2. A disazo compound according to claim 1 in which Q is a phenyl group represented by the formula:

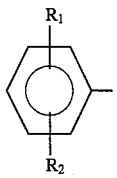

wherein $R_1$ and $R_2$ independently of one another are each a hydrogen atom, a nitro, sulfo, sulfamoyl, $C_1$–$C_4$ alkyl, $C_1$–$C_4$ alkoxyl, substituted or unsubstituted amino, or carboxyl group, or a halogen atom.

3. A disazo compound according to claim 1 in which Q is a naphthyl group represented by the formula:

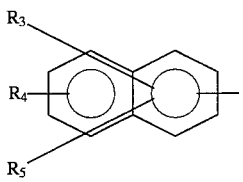

$R_3$, $R_4$ and $R_5$ independently of one another are each a hydrogen atom or a hydroxyl or sulfo group.

wherein Q is a substituted or unsubstituted phenyl or naphthyl group; Me is a copper, nickel, zinc or iron atom; and Z is a hydrogen atom [or a lower alkyl, lower alkoxyl, sulfo, or substituted or unsubstituted amino group], a methyl, ethyl, methoxyl, ethoxyl, or acetyl amino group.

4. A disazo compound according to claim 3 wherein at least one of $R_3$, $R_4$ and $R_5$ is a sulfo group.

5. A disazo compound according to claim 2, wherein $R_1$, and $R_2$ independently of one another are a hydrogen atom, a nitro, sulfo, sulfamoyl, methyl, ethyl, methoxyl, ethoxyl or carboxyl group or a chlorine atom.

* * * * *